(12) United States Patent
Driver

(10) Patent No.: US 10,309,443 B1
(45) Date of Patent: Jun. 4, 2019

(54) MULTIPLE-HOLE ROPE THIMBLE

(71) Applicant: Sherrill, Inc., Greensboro, NC (US)

(72) Inventor: J. David Driver, Bel Air, MD (US)

(73) Assignee: ETCO, Inc., Warwick, RI (US)

( * ) Notice: Subject to any disclaimer, the term of this patent is extended or adjusted under 35 U.S.C. 154(b) by 230 days.

(21) Appl. No.: 14/826,306

(22) Filed: Aug. 14, 2015

(51) Int. Cl.
  *F16B 45/00* (2006.01)
  *F16G 11/04* (2006.01)

(52) U.S. Cl.
  CPC .............. *F16B 45/00* (2013.01); *F16G 11/04* (2013.01)

(58) Field of Classification Search
  CPC ........ F16B 45/00; F16G 11/04; F16G 11/146; F16G 11/14; F16G 11/046; F16G 11/00; Y10T 24/3916; Y10T 24/3971; Y10T 24/3991; B63B 21/04
  See application file for complete search history.

(56) References Cited

U.S. PATENT DOCUMENTS

| | | | | |
|---|---|---|---|---|
| 356,116 A * | 1/1887 | Garfield | ................ | F16G 11/14 16/202 |
| 857,717 A | 6/1907 | Brown | | |
| 1,021,986 A * | 4/1912 | Johnson | ................ | F16G 11/04 24/136 R |
| 1,081,735 A * | 12/1913 | Gilmartin | ............. | F16G 11/00 24/115 K |
| 1,090,377 A * | 3/1914 | Blackburn | ............. | F16G 11/04 24/136 K |
| 1,393,245 A * | 10/1921 | Rosemeyer | ............. | F16G 11/14 24/115 R |
| 1,546,798 A * | 7/1925 | Seagren | ................ | F16G 11/14 24/129 B |
| 2,003,225 A * | 5/1935 | Vrooman | ............. | F16G 11/14 174/141 R |
| 2,155,536 A | 4/1939 | Fauria | | |
| 2,189,671 A | 2/1940 | Mardis | | |
| 2,193,236 A * | 3/1940 | Meighan | ............. | F16G 11/14 24/129 R |
| 2,506,274 A * | 5/1950 | Maxwell | ............. | F16G 11/14 24/129 R |
| 2,729,480 A | 1/1956 | Berndt | | |
| 3,083,991 A | 4/1963 | Gale | | |
| 3,795,952 A | 3/1974 | Ratcliff | | |
| 4,034,443 A * | 7/1977 | Turner | ............. | F16G 11/14 24/129 B |
| 4,358,212 A | 11/1982 | Compton | | |
| 4,540,209 A * | 9/1985 | Cody | ............. | F16G 11/00 294/74 |

(Continued)

FOREIGN PATENT DOCUMENTS

EP    2489584 A1 *  8/2012  ............. B63B 21/04

*Primary Examiner* — Victor D Batson
*Assistant Examiner* — Matthew J Sullivan
(74) *Attorney, Agent, or Firm* — Altman & Martin; Steven K Martin

(57) ABSTRACT

A multiple-hole rope thimble with a body, a plurality of holes, and a perimeter groove. The holes can be arranged linearly or non-linearly arranged and can be the same or different sizes. The hole wall is curved toward the center of the hole to eliminate any sharp edges that can damage a rope. The groove extends completely around the perimeter of the body. A rope fits into the groove and is secured around the thimble by a splice or a knot. Optionally, the rope is secured by a thread extending through an aperture in the partition between holes.

13 Claims, 4 Drawing Sheets

(56) References Cited

U.S. PATENT DOCUMENTS

| | | | | |
|---|---|---|---|---|
| 5,317,788 A | * | 6/1994 | Esposito | B62J 7/08 24/300 |
| 5,519,921 A | * | 5/1996 | Templer, Jr. | B63B 21/08 24/130 |
| 6,317,935 B1 | * | 11/2001 | O'Rouke | A62B 1/04 24/115 K |
| 6,336,260 B1 | | 1/2002 | Mauthner | |
| D571,192 S | | 6/2008 | Stomp et al. | |
| 7,464,443 B2 | * | 12/2008 | Lopes Praca | B60P 7/0823 114/218 |
| 7,743,597 B2 | * | 6/2010 | Shnayder | B63B 21/04 24/3.4 |
| 8,201,309 B1 | * | 6/2012 | Franta | B63B 21/04 24/129 R |
| 8,646,157 B2 | * | 2/2014 | Hayes | F16B 45/00 24/372 |
| D716,640 S | * | 11/2014 | Martinson | D8/356 |
| D735,020 S | * | 7/2015 | Bradford | D8/356 |
| 9,168,044 B2 | * | 10/2015 | Kirkham | A61B 17/1322 |
| 9,394,033 B2 | * | 7/2016 | Firing | B63B 21/04 |
| 9,433,261 B1 | * | 9/2016 | Miles | A44B 13/0029 |
| 2009/0320248 A1 | * | 12/2009 | Naquin | F16G 11/14 24/129 R |
| 2012/0042494 A1 | * | 2/2012 | Fay | F16G 11/146 29/428 |
| 2013/0255218 A1 | * | 10/2013 | Maciuba | F16G 11/146 59/84 |
| 2016/0017911 A1 | * | 1/2016 | Snow | F16B 45/00 403/23 |
| 2016/0069369 A1 | * | 3/2016 | Haas | E04H 15/64 24/682.1 |
| 2017/0080260 A1 | * | 3/2017 | Pettey | A62B 1/14 |

* cited by examiner

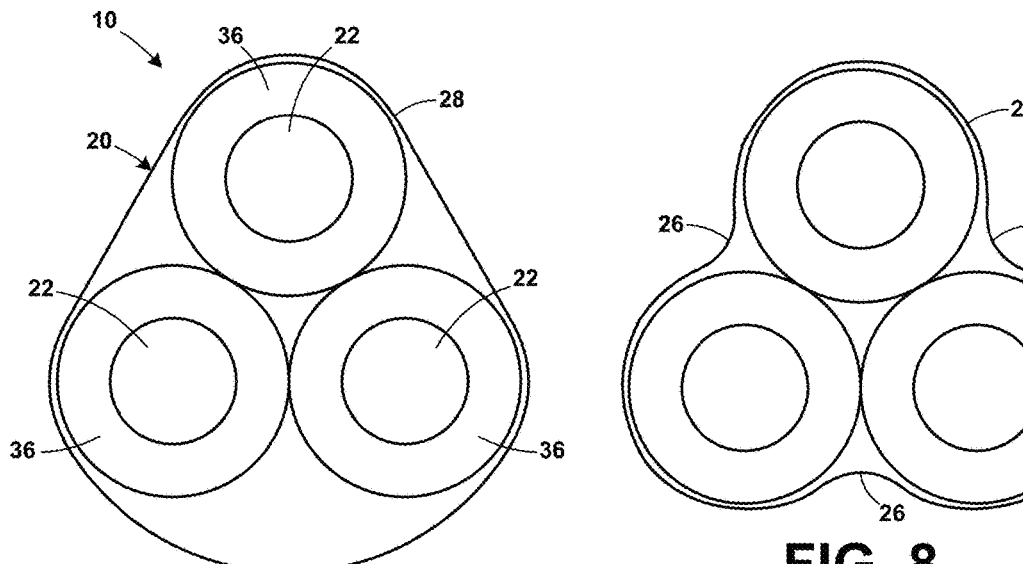
FIG. 7
FIG. 8
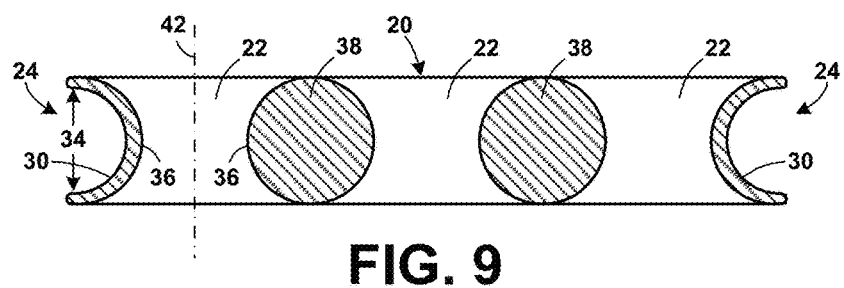
FIG. 9
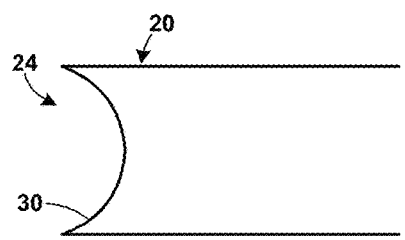
FIG. 10
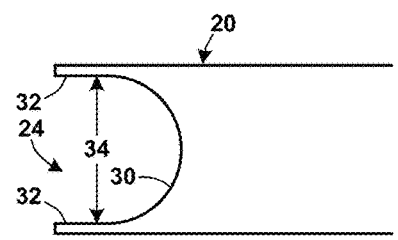
FIG. 11

MULTIPLE-HOLE ROPE THIMBLE

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to tree rigging, more particularly, to rope thimbles for forming loops at the end of a rope or friction between ropes.

2. Description of the Related Art

Thimbles are commonly used inside spliced eyes or loops at the end of a rope to prevent the rope from bending too sharply and to prevent chaffing of the rope. There are two basic shapes of thimbles, teardrop and circular. A teardrop thimble is typically a length of steel bent into a teardrop shape and that has a perimeter groove that accepts the rope. A circular thimble is a ring with a hole in the center and a perimeter groove that accepts the rope. For both types, the rope surrounds the thimble, fitting into the groove. The rope is spliced around the thimble in order to retain the thimble in the loop.

Circular thimbles have a drawback in that the bend radius of the perimeter of the thimble is too small for the typical rope. This means that the rope typically bends around the thimble at a radius that is smaller than the minimum radius recommended for ropes, putting a strain on the rope and reducing its usable life.

BRIEF SUMMARY OF THE INVENTION

The present invention is a multiple-hole rope thimble with a body, a plurality of holes, and a perimeter groove.

The holes can be arranged linearly or non-linearly arranged. With linear-arranged holes of the same size, the body will be an oval. With linearly-arranged holes of different sizes, the shape of the body will depend on the size of the holes. The shape of the body with non-linearly-arranged holes depends on the number and size of the holes. There can be no concave sections of the perimeter and the bends in the perimeter cannot be too sharp.

Typically, the holes are round, but can be other shapes, such as oval. The inside wall of the hole is curved toward the center of the hole to eliminate any sharp edges that can damage a rope.

Typically the holes are spaced closely together, while maintaining the robustness of the partition between the holes, but can be farther apart.

The groove extends completely around the perimeter of the body. Typically, the groove is semicircular in cross-section. but can be less than semicircular, or can have walls that are higher. The groove diameter is the same as the maximum size rope the thimble is designed to accommodate.

The rope fits into the groove and is secured around the thimble by a splice or a knot. Optionally, the rope is secured by a thread extending through an aperture in the partition between holes.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 7 is a top view of a thimble of the present invention with three non-linearly-arranged holes with a partially circular body;

FIG. 8 is a top view of a thimble with an unacceptable inward curve;

FIG. 9 is cross-sectional view of the three-hole thimble of FIG. 3 with a semicircular groove;

FIG. 10 is a detail of a less than semicircular groove;

FIG. 11 is a detail of a groove with higher walls;

DETAILED DESCRIPTION OF THE INVENTION

The present invention is a multiple-hole rope thimble 10. It has a body 20, a plurality of holes 22, and a perimeter groove 24.

Figure 1:
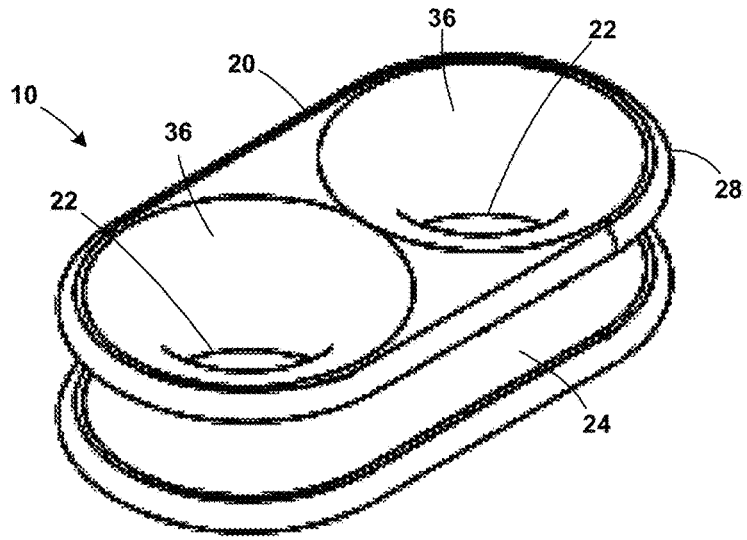
FIG. 1 is a perspective view of a thimble of the present invention with two holes of the same size.
Figure 2:
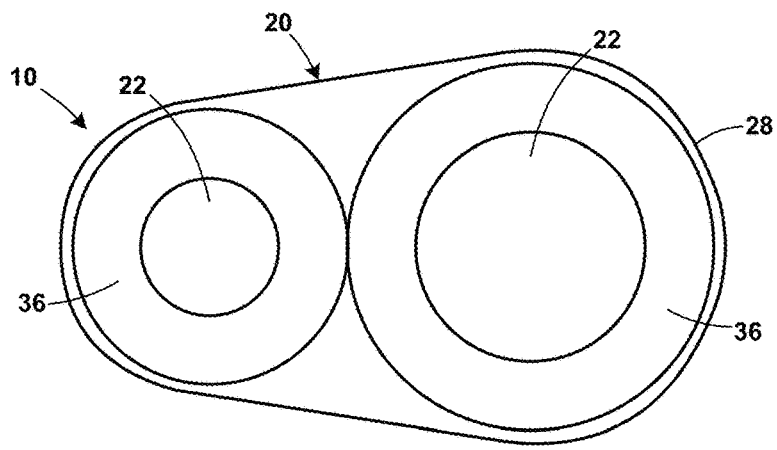
FIG. 2 is a plan view of a thimble of the present invention with two holes of different sizes.
Figure 3:
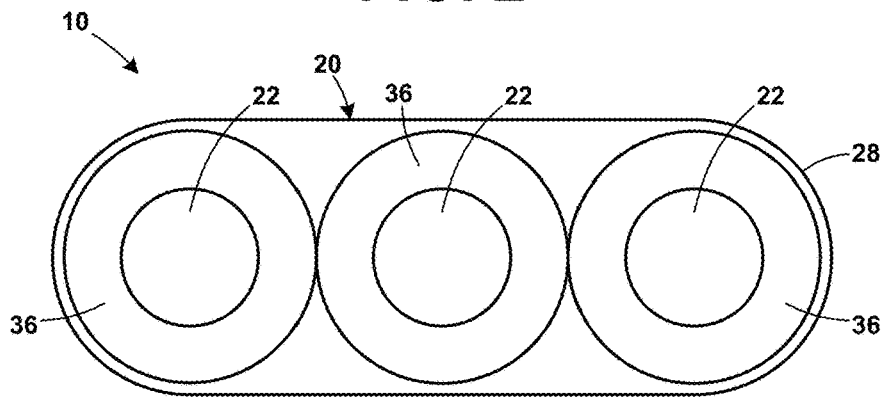
FIG. 3 is a top view of a thimble of the present invention with three linearly-arranged holes of the same size.
Figure 4:
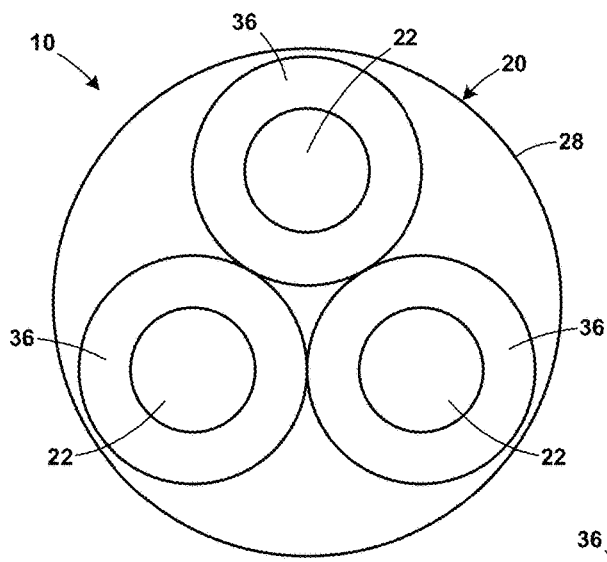
FIG. 4 is a top view of a thimble of the present invention with three non-linearly-arranged holes with a circular body.
Figure 5:
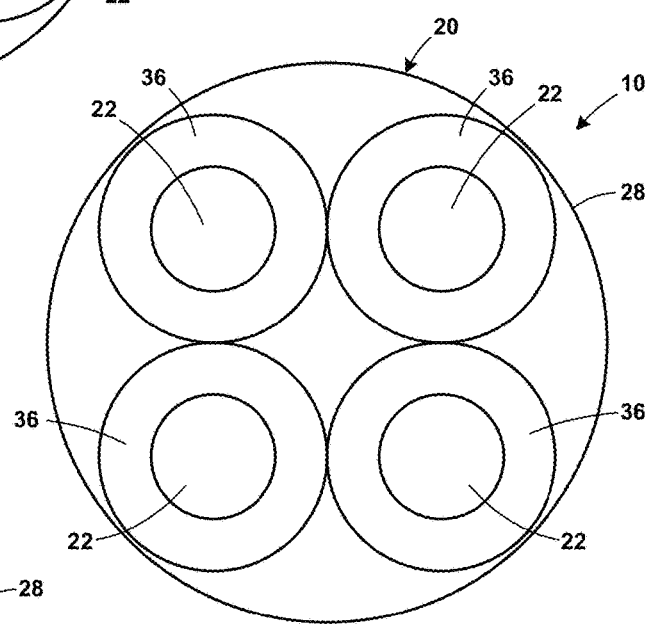
FIG. 5 is a top view of a thimble of the present invention with four non-linearly-arranged holes with a circular body.

The present invention contemplates that the holes 22 can be arranged linearly, as in FIG. 3, or non-linearly, as in FIGS. 4 and 5. Two holes 22, as in FIGS. 1 and 2, are neither linear nor non-linear, but are treated as linear in the present specification. With linearly-arranged holes 22, the body 20 is an oval, as in FIGS. 1-3. If the holes 22 are the same size, the oval is symmetrical with straight sides, as in FIGS. 1 and 3. For the present invention, an oval is hereby defined as including shapes with straight sides, as in FIGS. 1 and 3. With linearly-arranged holes 22 of different sizes, the body 20 is generally an oval, but the exact shape of the body 20 depends on the size of the holes. In the example of FIG. 2, the body 20 is egg-shaped with straight sides.

Figure 6:
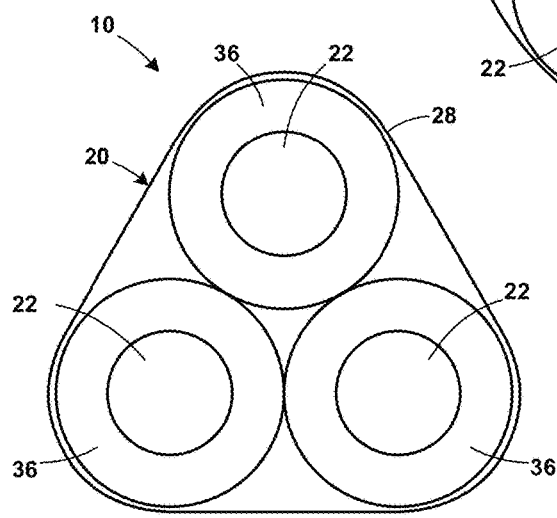
FIG. 6 is a top view of a thimble of the present invention with three non-linearly-arranged holes with a non-circular body.

The shape of the body 20 with non-linearly-arranged holes 22 depends on the number and size of the holes 22. In the example of FIGS. 4 and 5, there are three and four holes 22, respectively, of the same size, so the body 20 is circular. Alternatively, the body 20 can be shaped more to the holes 22, as in FIG. 6, or a combination of circular and non-circular, as in FIG. 7.

There are two limitations to the shape of the body 20. The first limitation is that the perimeter 28 must trace a convex curve, that is, there can be no concave sections of the perimeter 28. The perimeter 28 can have straight sections and the present invention hereby defines a convex curve as including straight sections, but there can be no sections of the perimeter 28 that curve inwardly. FIG. 8 shows a thimble with a perimeter having unacceptable concave sections 26.

The second limitation is that the bends in the perimeter 28 cannot be too sharp. What "too sharp" means depends on the size and type of rope that the thimble 10 is designed to be used with. The smaller diameter rope the thimble is designed for, the sharper the bend can be. The material of the rope also has a bearing, as some materials permit the rope to bend more sharply than other materials. Typically, it is preferred that the relationship between the radius of the thimble perimeter bend and the diameter of the rope be at least 6:1. That is, the radius of the sharpest bend on the perimeter 28 of the thimble should not be less than six times the diameter of the rope.

Typically, the holes 22 are round, as in the figures. However, the present invention contemplates that the holes 22 can be other shapes, such as oval. Further, as alluded to above, all of the holes 22 in one thimble 10 do not have to be the same size.

As shown in FIG. 9, the wall 36 of the hole 22 curves inwardly toward the axis 42 of the hole 22 so as to eliminate any sharp edges that can damage a rope passing through the hole 22. Typically, the wall 36 is curved parabolically. However, the present invention contemplates any shape to the curve, such as semicircular, so that there are no sharp edges.

Typically the holes 22 are spaced closely together, while maintaining the robustness of the partition 38 between the holes 22. The present invention contemplates that the holes 22 can be spaced farther apart or that pairs of holes 22 can be spaced different distances apart.

The groove 24 extends completely around the perimeter 28 of the body 20. Typically, the groove 24 is semicircular in cross-section, as in FIG. 9. The present invention contemplates that the groove 24 can less than semicircular, as in FIG. 10. The present invention also contemplates that the groove wall 30 can have extensions 32 that extend tangentially from a semicircular portion of the groove 24 toward the perimeter 28, as in FIG. 11.

The diameter 34 of the groove 24 is the same as the maximum size rope the thimble 10 is designed to accommodate.

The present invention contemplates that the thimble 10 can be composed of any rigid, robust material. A non-exhaustive list of examples includes metal alloys such as steel and aluminum alloys, hard plastics, rubber, and carbon composites. A less robust material can be used, if the thimble 10 is designed to accommodate a lesser amount of stress.

Figure 12:
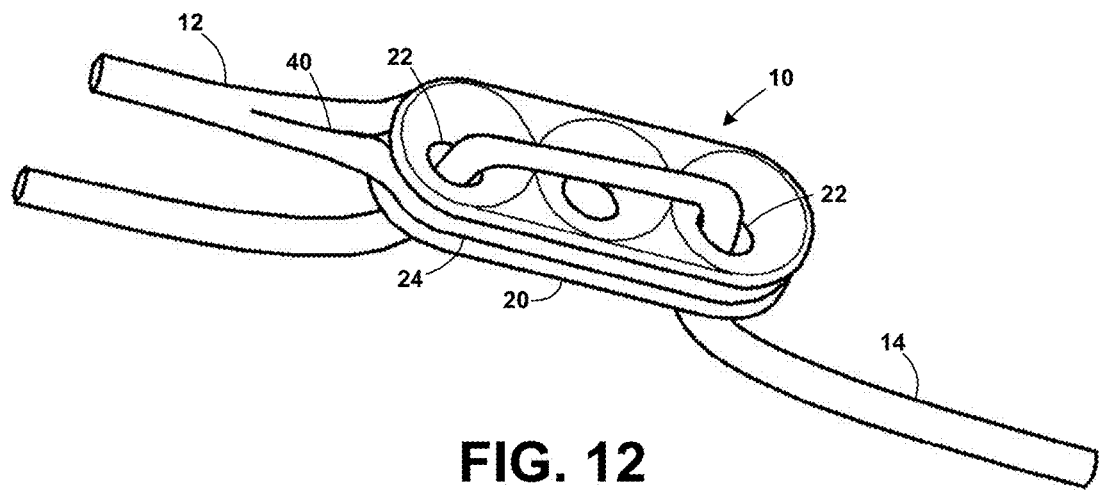
FIG. 12 is a perspective view of a thimble and rope assembly with another rope.

The rope 12 is secured around the thimble 10 as shown in FIG. 12. The rope 12 fits into the groove 24 and is spliced, as at 40. The present invention contemplates that different types of splices can be used. In a machine-sewn splice, adjacent ropes are stitched together with thread. In a hand splice, rope strands are manipulated to create a semi-permanent joint. Alternatively, a knot can be used to join two ropes around the thimble. For the present invention, a hand splice is preferred.

One or more other ropes 14 can be threaded through the holes 22, as in FIG. 12.

Figure 13:
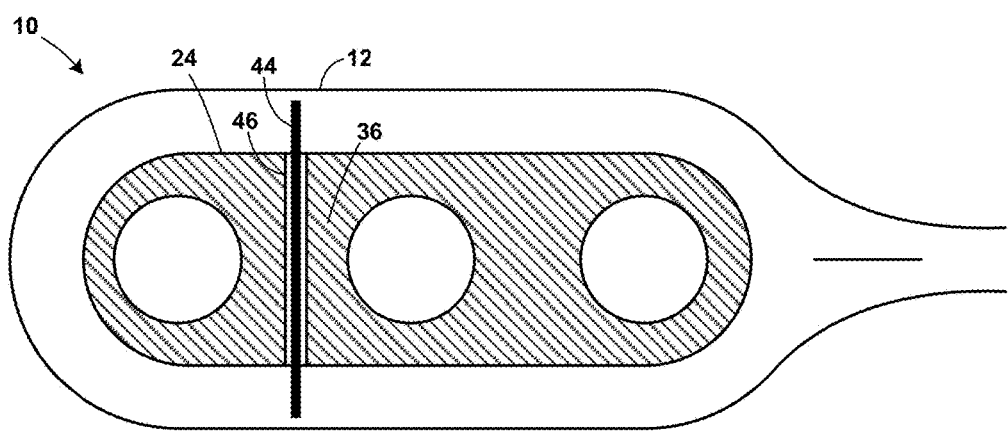
FIG. 13 is a cross-sectional view showing a thread through an aperture.

Optionally, the rope 12 is secured by a thread 44 extending through an aperture 46 in the partition 38 between holes 22. As shown in FIG. 13, the aperture 46 extends completely through the body 20 from the groove 24 on one side to the groove 24 on the other side. The aperture 46 is large enough to accommodate the size of the thread 44 being used to secure the rope 12. The thread 44 is threaded or passed through the aperture 46. The rope 12 is wrapped around the thimble 10 and secured by the splice 40. Both ends of the thread 44 are attached to the rope 12 adjacent to the end of the aperture 46 from which the thread emerges.

Thus it has been shown and described a multiple-hole rope thimble. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A rope thimble comprising:
    (a) a unitary body having a perimeter tracing a convex curve;
    (b) a plurality of holes in the body, each hole having an axis and a wall, the entire circumference of the wall of each hole being rounded inwardly toward the axis of the same hole, all axes being parallel to each other; and
    (c) a groove in the perimeter extending completely around the body and configured to accept a rope.

2. The rope thimble of claim 1 wherein all of the holes are arranged linearly in one line and the body is an oval.

3. The rope thimble of claim 2 wherein all of the holes are the same size and the body is a symmetrical oval.

4. The rope thimble of claim 1 wherein the holes are non-linearly arranged and the body is a circle.

5. The rope thimble of claim 1 wherein the body is composed of a metallic material.

6. The rope thimble of claim 1 wherein the body is composed of an aluminum alloy.

7. The rope thimble of claim 1 wherein the groove is semicircular in cross-section.

8. The rope thimble of claim 1 wherein the groove has a semicircular portion and walls that extend tangentially toward the perimeter.

9. A rope thimble comprising:
    (a) a unitary body composed of an aluminum alloy and having a perimeter tracing a symmetrical oval;
    (b) a plurality of holes in the body, each hole having an axis and a wall, all of the holes being arranged in one line, the entire circumference of the wall of each hole being rounded inwardly toward the axis of the same hole, all axes being parallel to each other, and all of the holes being the same size; and
    (c) a groove in the perimeter extending completely around the body and configured to accept a rope.

10. The rope thimble of claim 9 wherein the groove is semicircular in cross-section.

11. The rope thimble of claim 9 wherein the groove has a semicircular portion and walls that extend tangentially toward the perimeter.

12. The rope thimble of claim 1 wherein all of the holes are round.

13. The rope thimble of claim 9 wherein all of the holes are round.

\* \* \* \* \*

UNITED STATES PATENT AND TRADEMARK OFFICE
CERTIFICATE OF CORRECTION

PATENT NO. : 10,309,443 B1
APPLICATION NO. : 14/826306
DATED : June 4, 2019
INVENTOR(S) : J. David Driver Page 1 of 1

It is certified that error appears in the above-identified patent and that said Letters Patent is hereby corrected as shown below:

On the Title Page

Item (73) The Assignee should read:
Sherrill, Inc., Greensboro, NC (US)

Signed and Sealed this
Second Day of July, 2019

Andrei Iancu
*Director of the United States Patent and Trademark Office*